(12) United States Patent
Tucker

(10) Patent No.: US 7,093,999 B2
(45) Date of Patent: Aug. 22, 2006

(54) INTERLOCKING SYSTEM

(76) Inventor: Deborah J. Tucker, 2171 Sawkill-Ruby Rd., Kingston, NY (US) 12401

(*) Notice: Subject to any disclaimer, the term of this patent is extended or adjusted under 35 U.S.C. 154(b) by 139 days.

(21) Appl. No.: 10/162,786

(22) Filed: Jun. 6, 2002

(65) Prior Publication Data

US 2003/0228189 A1     Dec. 11, 2003

(51) Int. Cl.
*E04B 1/26* (2006.01)

(52) U.S. Cl. .................. 403/331; 403/364; 403/329; 24/545; 24/563

(58) Field of Classification Search .......... 403/49, 403/331, 364, 329, 397; 24/563, 545; 221/73, 221/199, 283; 220/23.2, 23.4, 23.86; 108/65, 108/152

See application file for complete search history.

(56) References Cited

U.S. PATENT DOCUMENTS

| | | | | |
|---|---|---|---|---|
| 3,351,366 A | * | 11/1967 | Page | 403/335 |
| 5,181,297 A | * | 1/1993 | Andrews et al. | 24/336 |
| 5,183,278 A | * | 2/1993 | Wade, Jr. | 280/47.35 |
| 5,765,707 A | * | 6/1998 | Kenevan | 220/4.28 |
| 5,772,038 A | * | 6/1998 | Murata et al. | 206/725 |

\* cited by examiner

*Primary Examiner*—Daniel P. Stodola
*Assistant Examiner*—Michael P. Ferguson

(57) ABSTRACT

An Interlocking System utilizing upper and lower grooves along the edges of the base of an item to interlock with upper and lower grooves on other items. One item described is a dispenser using a spongy material to force a tape with labels upwardly to be withdrawn. Another item with upper and lower grooves is a storage box.

5 Claims, 9 Drawing Sheets

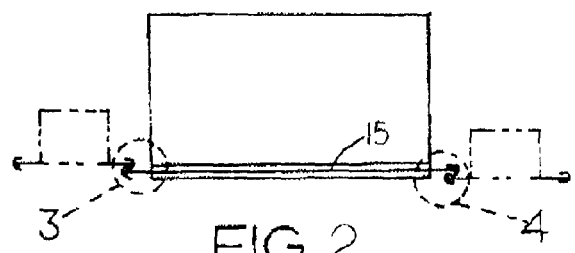
FIG. 2
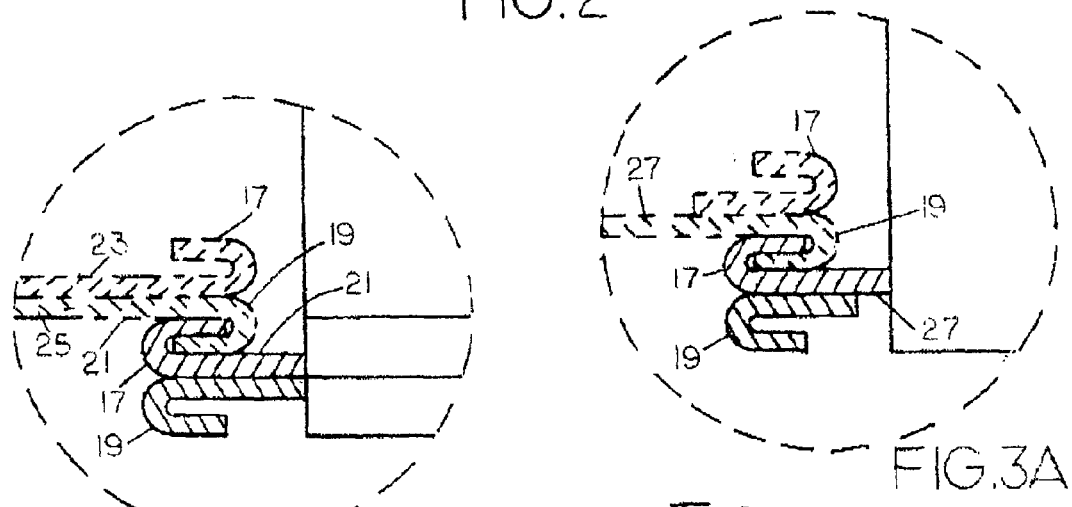
FIG. 3
FIG. 3A
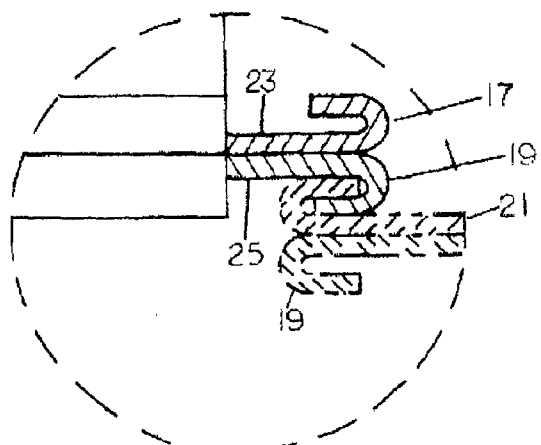
FIG. 4

INTERLOCKING SYSTEM

BACKGROUND OF THE INVENTION

1. Field of the Invention

This invention relates to interlocking systems and more particularly to a system with a variety of items that interlock with one another at the base, such items including items for office usage, such as label dispensers but may be used equally well with kitchen and other items. This invention further relates to specific office equipment for use in the Interlocking System such as a label dispenser and a storage box or file cabinet with filing products.

2. Prior Art

Frequently, various items are used together such as on a desk or in a kitchen. One item may, and often does, become separated and it is not uncommon for an item to be removed and then not be available when needed. This pertains to many different types of items of which office and kitchen equipment are just two.

A decided advantage would be achieved if various items could be connected in an orderly fashion but while permitting an item to be disconnected should the need arise to separate any one or more items while still preventing easy separation.

By way of example, one piece of office equipment that is advantageous to have available is a label dispenser. Labels are widely used. Many, such as return address labels are preprinted. Other labels are left blank to be filled in to meet a particular need such a labels used to identify food storage packages. Increasingly, labels have a sticky back and are dispensed from a tape on which they are mounted for ready removal when being put on just about anything which they are to identify. A dispenser, preferably a reusable dispenser, that permits ready access to labels and maintains them in storage for use would serve a need. An added benefit would be derived from a dispenser that can be annexed readily to or have annexed to it other items which have some relationship to it.

Another frequently used piece of office equipment is a storage cabinet. Whether used for file folders or the storage of various office devices such as pens and erasers, it is very helpful in an office. Like the label dispenser, it would be an added benefit to have a storage box that can be annexed readily to or have affixed to it other objects used in conjunction with it.

Objects

It is an object of this invention to provide an Interlocking System by which various items can be secured to one another.

It is a further object of this invention to provide an Interlocking System by which various items can be secured to one another while also being detachable from one another.

It is another object of this invention to provide a dispenser for the convenient dispensing of labels that is inexpensive and durable.

It is still another object of the present invention to provide a dispenser that can be secured to other items.

It is a further object of the present invention to provide an inexpensive and durable storage box that can be secured to other items.

These and other objects will be apparent to those skilled in the art based upon the description of the preferred embodiment.

SUMMARY OF THE INVENTION

A Interlocking System is provided for interlocking a plurality of items. A first item includes a first base having at least one edge. The edge has a first upper groove and a first lower groove. The first upper groove being turned away from the first lower groove and over the first base and the first lower groove being turned away from the first upper and down under the first base. A second item includes a second base also having at least one edge. This edge also has a second upper groove and a second lower groove, the second upper groove being turned away from the second lower groove and over the second base and the second lower groove being turned away from the second upper groove and down under the second base. The second lower groove is locked into the first upper groove.

DETAILED DESCRIPTION OF THE DRAWINGS

FIG. 2 is a side elevation of a storage box with a smaller item attached at the left side of the storage box as faced and another smaller item attached to it at the right side of the storage box.

FIG. 3 is an enlarged view of the attachment of the base edges at the left side.

FIG. 3A is an enlarged view similar to FIG. 3 but showing the upper groove attached to a base formed from a single sheet and a lower groove attached to a base formed from a single sheet.

FIG. 4 is an enlarged view of the base edge attachment at the left side.

DETAILED DESCRIPTION OF THE NUMERALS

| NUMERAL | DESCRIPTION |
|---|---|
| 11 | Storage Box |
| 13 | Base |
| 15 | Edges |
| 17 | Upper Groove |
| 19 | Lower Groove |
| 21 | Sheets |
| 23 | Top Sheet |
| 25 | Bottom Sheet |
| 27 | Single Sheet |
| 29 | Label Dispenser |
| 31 | Labels |
| 33 | Tape |
| 35 | Holder |
| 37 | Lower Edge |
| 39 | Two Side Walls |
| 41 | Ends |
| 43 | Top Edges |
| 45 | Top |
| 47 | Opening |
| 49 | Resilient Member |
| 51 | Bottom Surface |
| 53 | Top Surface |
| 55 | Plate |
| 57 | Band |
| 59 | End Member |
| 61 | Front Side |
| 63 | Rear Side |
| 65 | Left Side |
| 67 | Right Side |
| 69 | Lid |
| 71 | Handle |
| 73 | Top Edge |
| 75 | Inner Channels |
| 77 | Inner Faces |
| 79 | Outer Channels |
| 81 | Outside Faces |
| 83 | Tabs |
| 85 | Hand Grip |
| 87 | Left End |
| 89 | Right End |
| 91 | Protrusion |
| 93 | Pocket |
| 95 | Enclosure |
| 97 | Inner Box |
| 99 | Two Ends |
| 101 | Base (Inner Box) |
| 107 | Base Sections (Inner Box) |
| 109 | Clips |
| 110 | Lower Surface |
| 111 | One Clip |
| 113 | Upper Surface |
| 115 | File Folder |
| 117 | Pocket |
| 119 | Bend Line |

DETAILED DESCRIPTION OF THE PREFERRED EMBODIMENT

Figure 1:
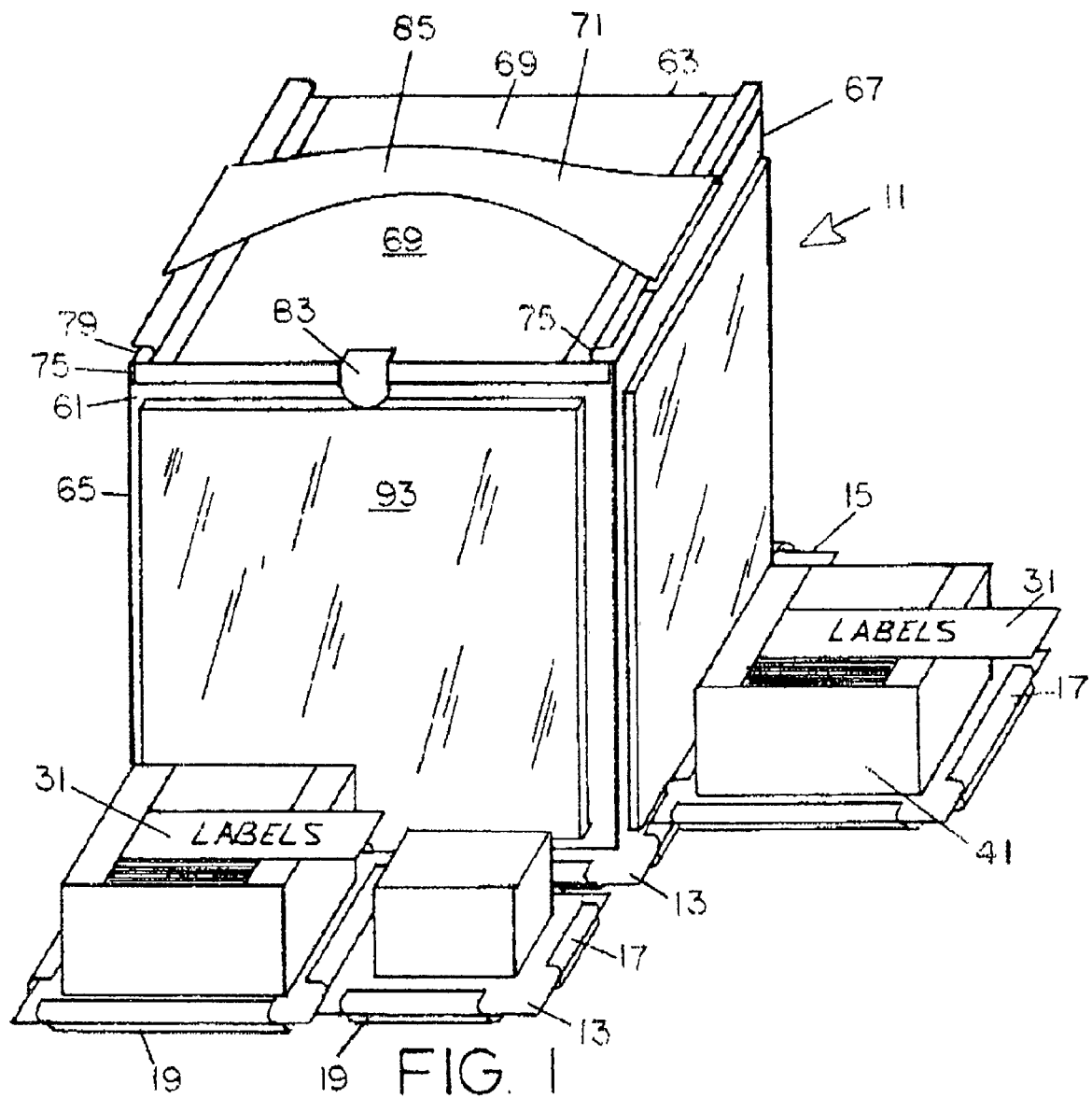
FIG. 1 is a pictorial view of a storage box with a label dispenser attached at one edge and another label dispenser attached at another side of the storage box.

Referring now to FIG. 1, a storage box 11 is shown. The storage box 11 is mounted on a base 13. The base 13, which is shown as being rectangular, has four edges 15. Each of the four edges 15 has an upper groove 17 and a lower groove 19. The base 13 may be formed from two sheets 21, one on top of the other. A top sheet top hook member 23 would then have the upper grooves 17 and a bottom sheet or bottom hook member 25 would have the lower grooves 19. In the alternative, a single sheet or single hook member 27 may be used which would have formed from it either the upper groove 17 or the lower groove 19. Then the other groove, be it the upper groove 17 or the lower groove 19, would be affixed to the single sheet or single hook member 27. This is shown in FIG. 3A where the single sheet or single hook member 27 is shown with a lower groove 19 attached to it for the storage box 11 and with the item affixed to it having an upper groove 17 attached to the single sheet 27.

At each of the four edges 15, the upper groove 17 is turned up and away from the base 13 and over itself. Similarly at each of the edges 15, the lower groove 19 is turned down away from the base 13 and the upper groove 17 and under itself. The upper groove 17 and the lower groove are U-shaped with the U turned ninety degrees with both grooves 17, 19 open inside the edge 15.

The upper grooves 17 are best used to affix to the storage box or any other item also having upper grooves 17 and lower grooves 19, as shown in FIG. 1. The lower grooves 19 are best used to affix the storage box 11 or any other item having upper grooves 17 and lower grooves 19 to other units similarly equipped. In order to be able to affix other items to the storage box 11, the other items (as shown in FIG. 1) must also have similar mating lower grooves 19 and upper grooves 17. The upper grooves 17 and the lower grooves 19 are sized to be forced into similar grooves on connecting items and then are held in place by the tight fit while still being removable.

FIG. 3 shows the upper groove 17 of the storage box 11 blocked into a lower groove 19 of an ancillary item affixed to the dispenser and FIG. 4 shows the detail of the lower groove 19 of the storage box 11, which is used as an example, fitted into the upper groove 17 of an auxiliary item.

Figure 5:
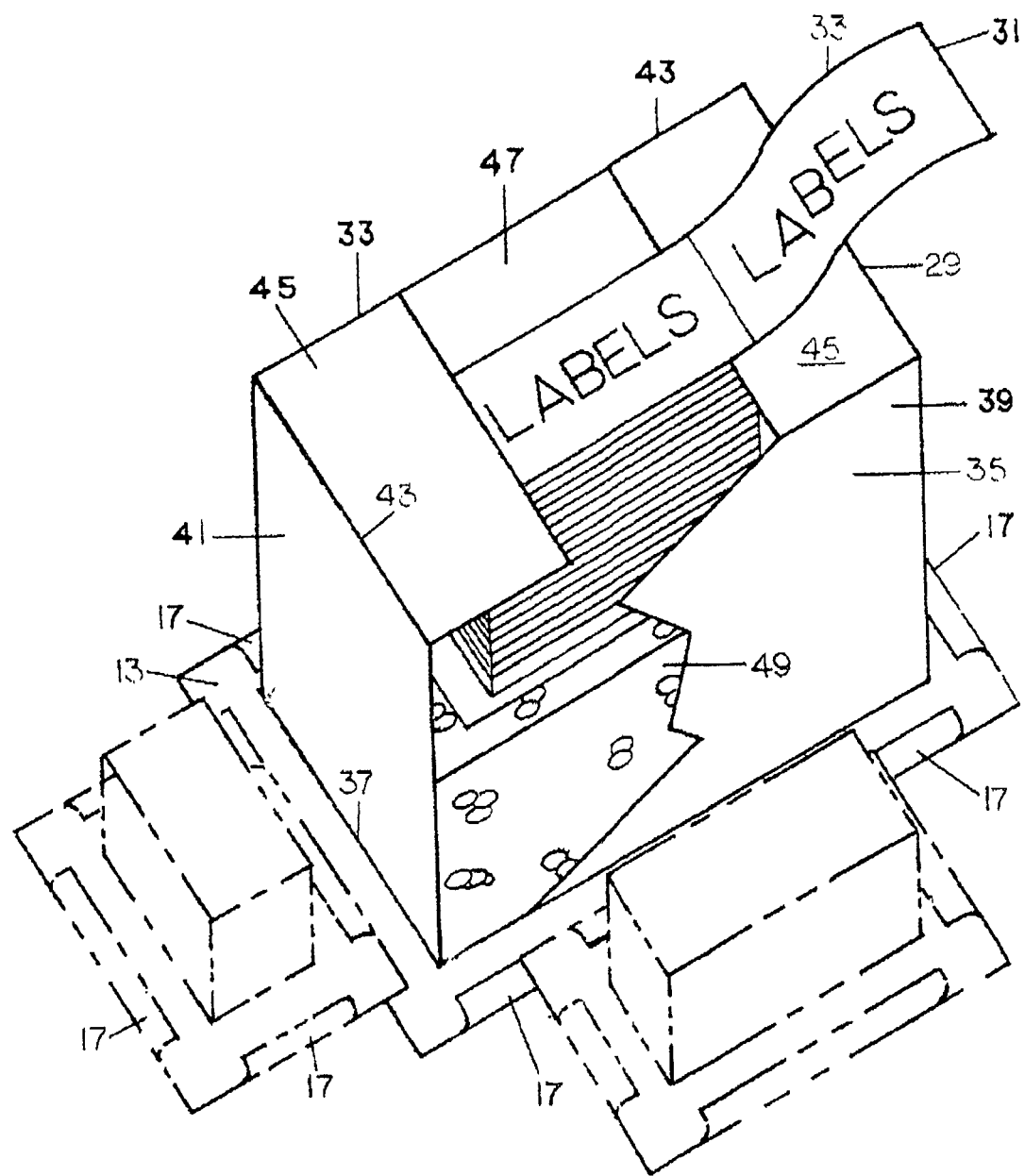
FIG. 5 shows a label dispenser with two smaller items of office equipment attached to it at the base of the label dispenser on two separate sides and with the enclosure of the label dispenser broken away showing the inner parts of the label dispenser.

In FIG. 5, a different combination is shown as a label dispenser 29 is the central item rather than the storage box 11 and two auxiliary items are attached to it with the lower groove 19 of the auxiliary item being secured within the upper groove 17 of the label dispenser 29.

Figure 6:
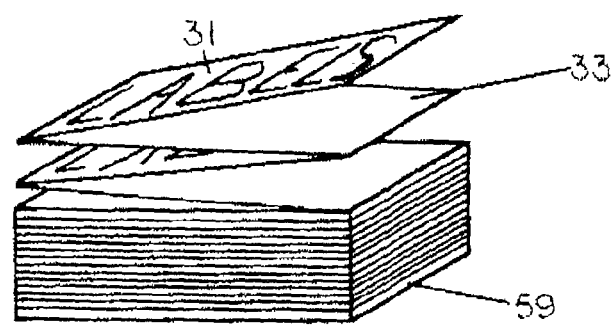
FIG. 6 is a pictorial view of the label stack folded for use in the label dispenser.

The variations of combination of items that can be secured together is virtually endless. As best seen in FIG. 4, FIG. 5, FIG. 7, FIG. 8, FIG. 9 and FIG. 10, the label dispenser 29 is shown. The labels 31 to be dispensed are mounted on a tape 33 which is folded back and forth (FIG. 6) in an accordion style. A holder 35 is secured to the base 13 of the label dispenser 29 at the lower edge 37 of two side walls 39, both of which are preferably solid but may have an opening. The side walls 39, which are substantially of the same size and generally parallel to one another, are sized to permit a pocket (not shown) to be affixed to hold a business card as the label dispenser 29 is very suitable as an item to be handed out for advertising purposes.

The holder 35 has ends 41 which may be either closed or left open. The ends 41 are shown closed in FIG. 5 and FIG. 10. From end 41 to end 41 and from the top edges 43 of the side walls 39 the holder 35 has a top 45. In the center of the top 45, substantially between the two ends 41, there is an opening 47 which preferably extends from side wall 39 to side wall 39. From the opening 47, the tape 33 with the labels 31 is dispensed and is also installed into the holder 35. However, when the ends 41 of the holder 35 are left open, installation of the tape 33 with the labels 31 can be achieved from either of the ends 41.

Figure 7:
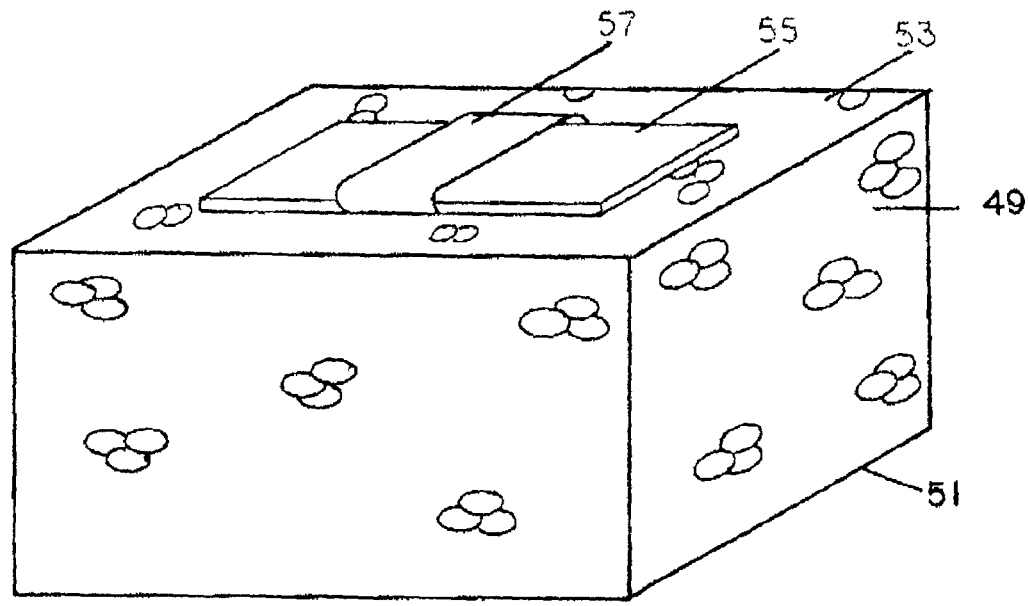
FIG. 7 is a pictorial view of a sponge material used in the label dispensers to force the label stack upwardly as labels are consumed.
Figure 8:
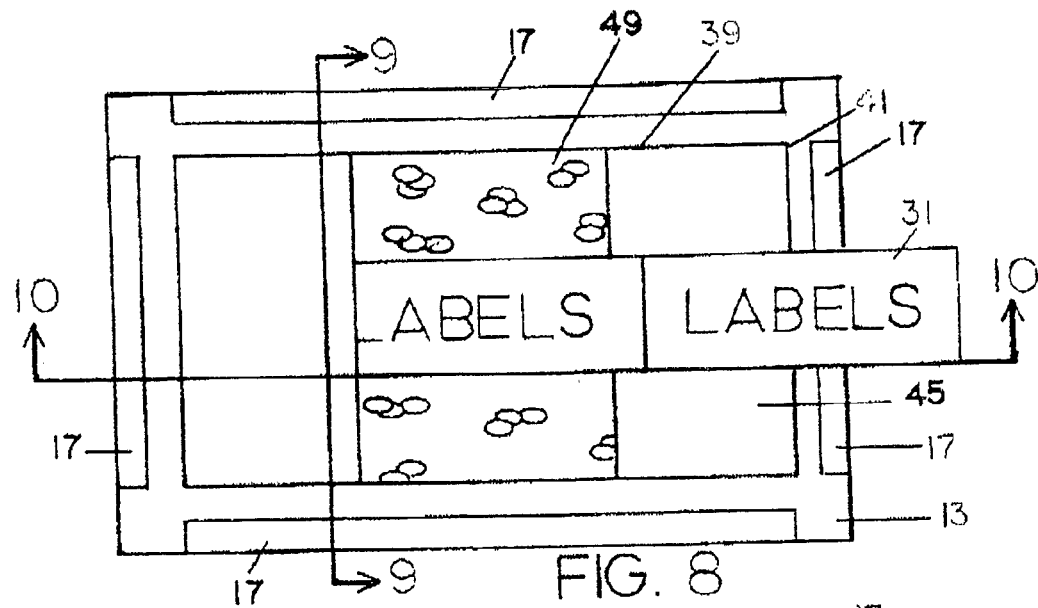
FIG. 8 is a top plan view of the label dispenser.
Figure 10:
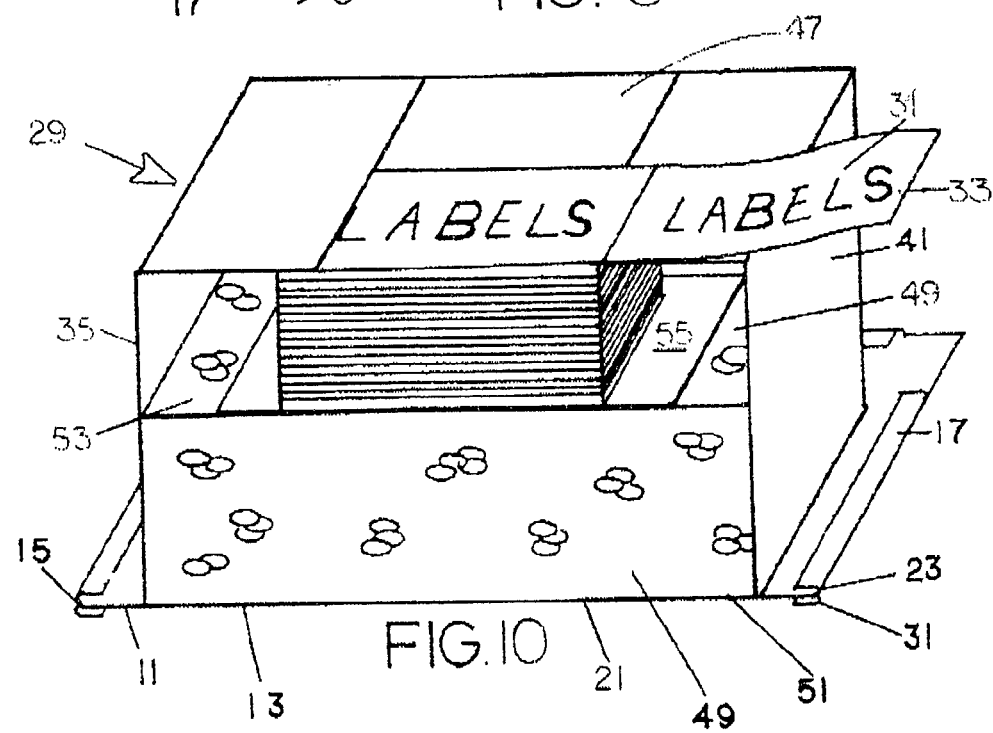
FIG. 10 is a pictorial cross sectional view along line 10—10 of FIG. 8.
Figure 9:
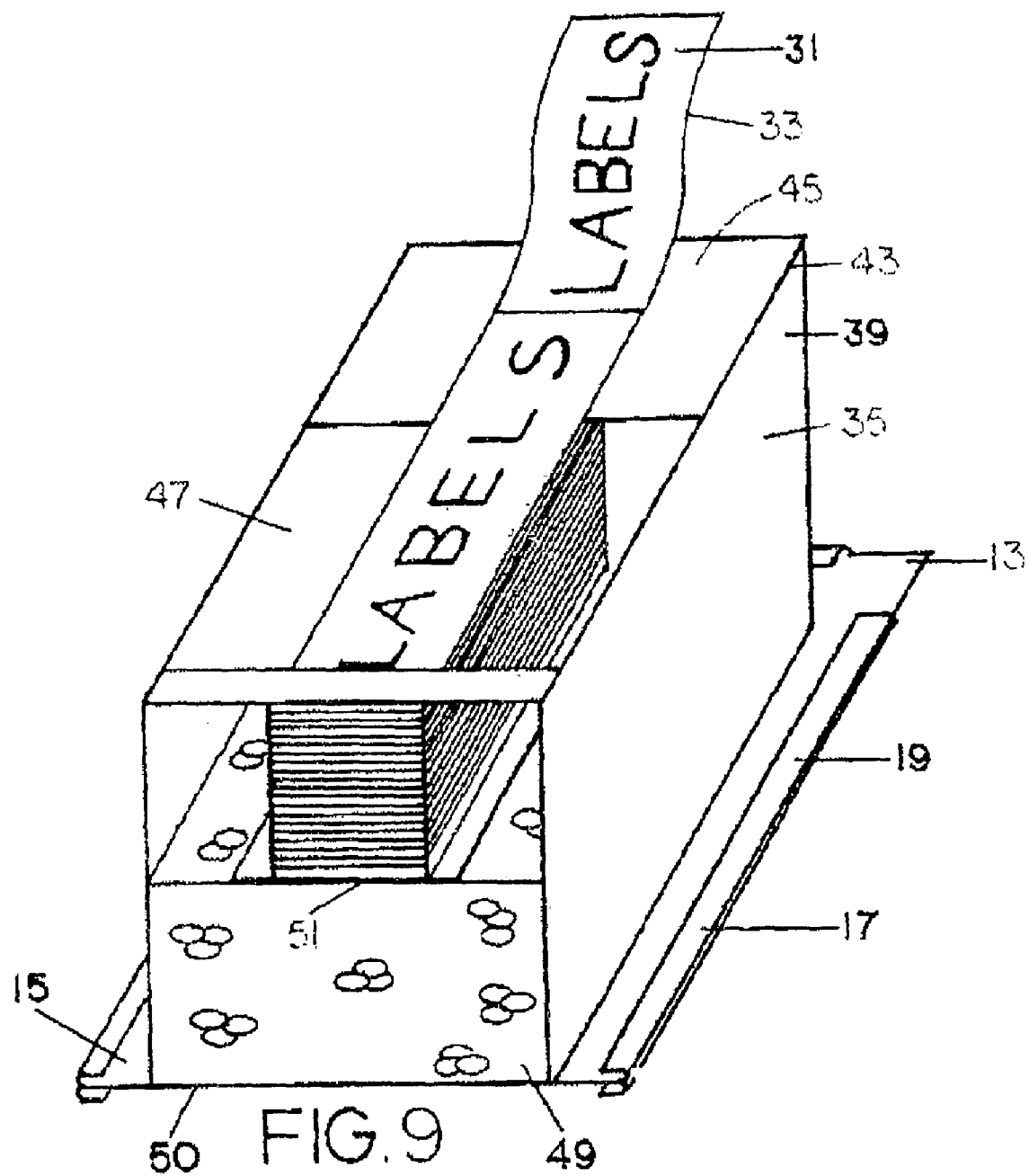
FIG. 9 is a pictorial view of the end of the label dispenser showing the label stack and the spongy material and the edge of the base for securing the label dispenser to other items.

As seen in FIG. 5 and FIG. 7, a resilient member 49, which is formed from a sponge-like material, is located in the holder 35. The resilient member 49 serves as a spring permitting the tape 33 with the labels 31 affixed to it to be placed into the holder 35 on top of the resilient member 49 thereby compressing the resilient member 49 to a comparatively small thickness. As the tape 33 with the labels 31 are consumed, the resilient member 49 expands forcing the tape 33 with the labels 31 upwardly to be easily removed. The resilient member 49 has a bottom surface 51 which is secured to the base 13 of the holder 35 by any suitable adhesive. The resilient member 49 has a top surface 53 opposite from the bottom surface 51.

As best seen in FIG. 7, a plate 55 is affixed to the top surface 53 of the resilient member 49. The plate 55 is also affixed to the resilient member 49 by any suitable adhesive. A band 57 is mounted on the top of the plate 55 with a space between the plate 55 and the band 57. An end member 59 of the tape 33 with the labels 31 is slid under the band 57 thus holding the tape 33 with the labels 31 in place on the resilient member 49. When the tape 33 and the labels 31 are consumed, the end member 59 is removed and the end member 59 of a new stack of labels 31 on a tap 33 is inserted.

Figure 11:
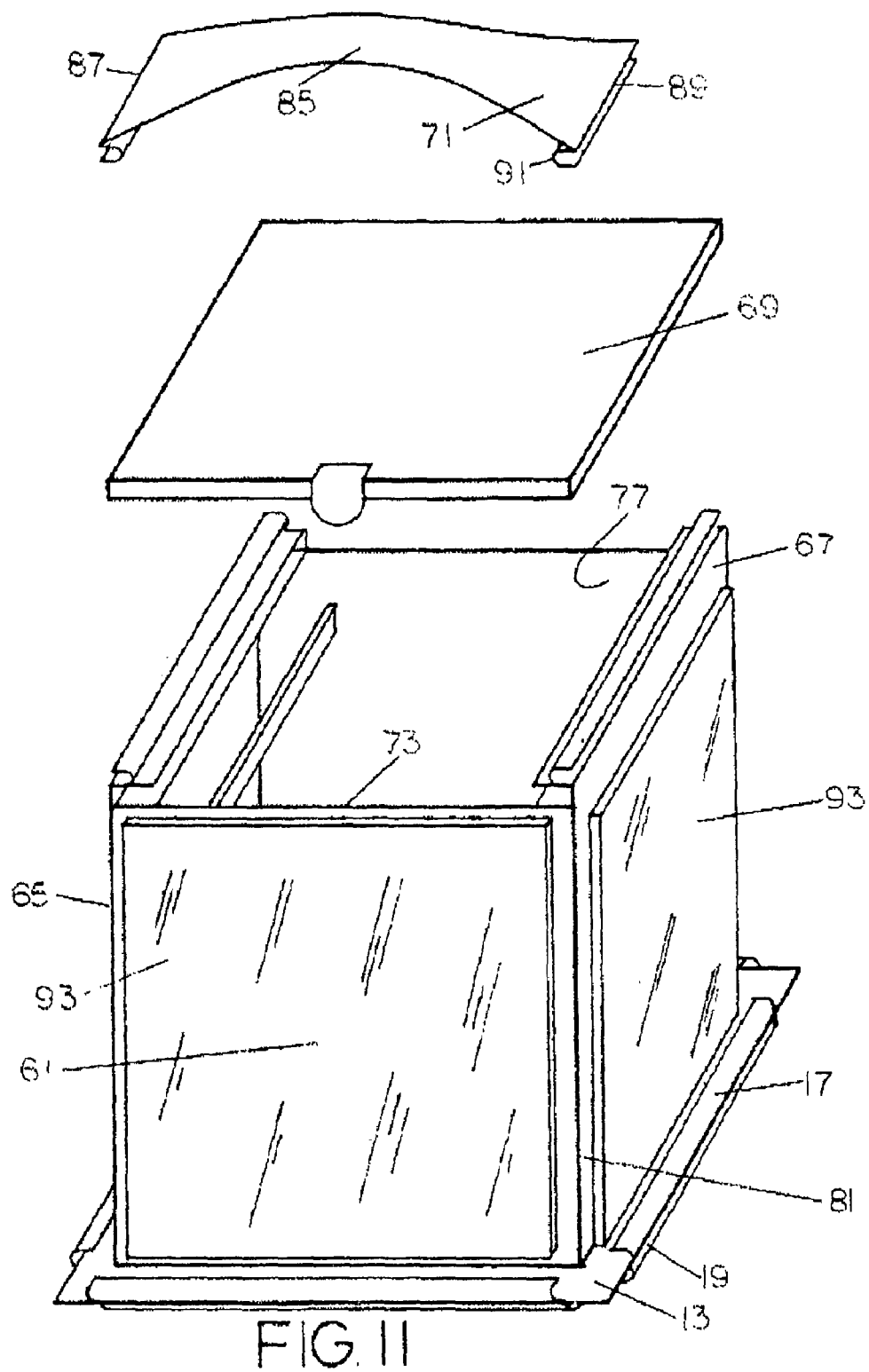
FIG. 11 is a pictorial exploded view of the storage box showing the lid and handle removed and with the edge of the base for connecting the storage box to other items.
Figure 12:
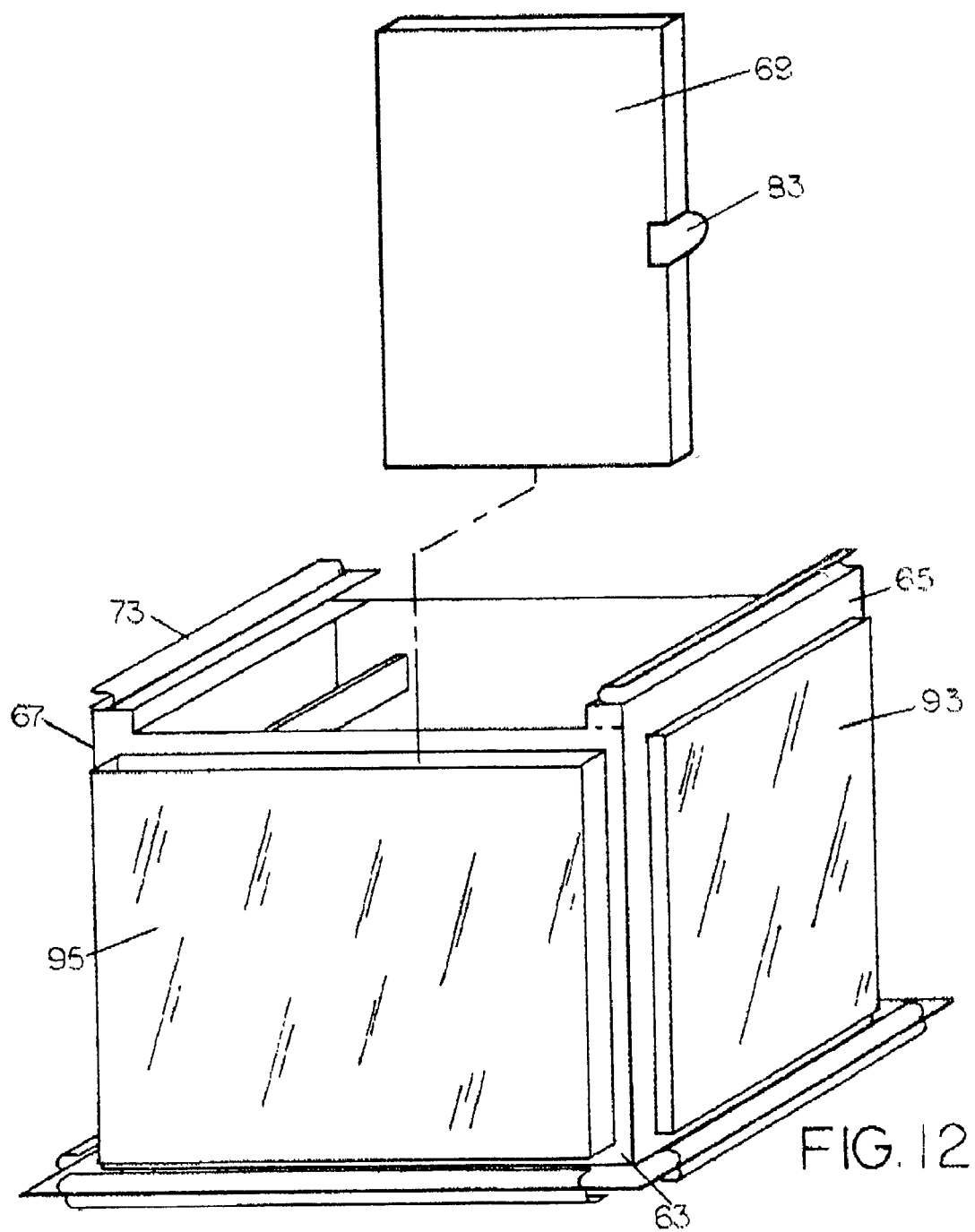
FIG. 12 is a pictorial view of the storage box showing the enclosure on the rear wall of the storage box for retaining the lid when removed from the top of the storage box.

The storage box 11, which is shown in FIG. 1 is also shown in even greater detail in FIG. 11 and FIG. 12. The storage box 11 has a front side 61, a rear side 63, a left side 65 and a right side 67 as well as the base 13 having the upper grooves 17 and the lower grooves 19 as previously described. The storage box 11 also has a lid 69 and handle 71 which are detachable. The left side 65 and right side 67 as well as the front side 61 and the rear side 63 have a top edge 73 adjacent to the lid 69 and handle 71. The left side 65 and the right side 67 extend slightly above the front side 61 and the rear side 63. An inner channel 75 is formed in the left side 65 and the right side 67 immediately adjacent to the top edge 73 of the front side 61 and the rear side 63 and the inner channel 75 face one another being located on the inner faces 77 of the left side 65 and the right side 67. The inner channels 75 are immediately above the front side 61 and the rear side 63.

Also on the left side 65 and the right side 67, above the inner channels 75 are outer channels 79 which face away from one another being on the outside faces 81 of the left side 65 and the right side 67.

The lid 69, which is a flat sheet, slides in the inner channels 75. A tab 83 located on the lid 69 serves as a pull point for the lid 69. The handle 71 is a flexible member which narrows in the center section to form a hand grip 85 and expands to a left end 87 and a right end 89. At the right end 89 and the left end 87, the handle 71 bends inwardly and then back outwardly forming a protrusion 91 having a U-shaped but turned on its side with the closed ends of each U facing one another. The two protrusions 91 fit into the outer channels 79 and as the handle 71 is lifted up, the protrusions 91 are forced more securely into the outer channels 79.

As seen in FIGS. 11 and 12, a pocket 93 is located on the left side 65, the right side 67 and the front 61 of the storage box 11. These pockets 83 are transparent and are multi-purpose and may be used for advertising but can be used for posting information, such as frequently called telephone numbers. As shown in FIG. 12, a larger and more substantial enclosure 95 is provided on the rear side 63 to store the lid 69 when removed from the top 45 of the storage box 11.

Figure 14:
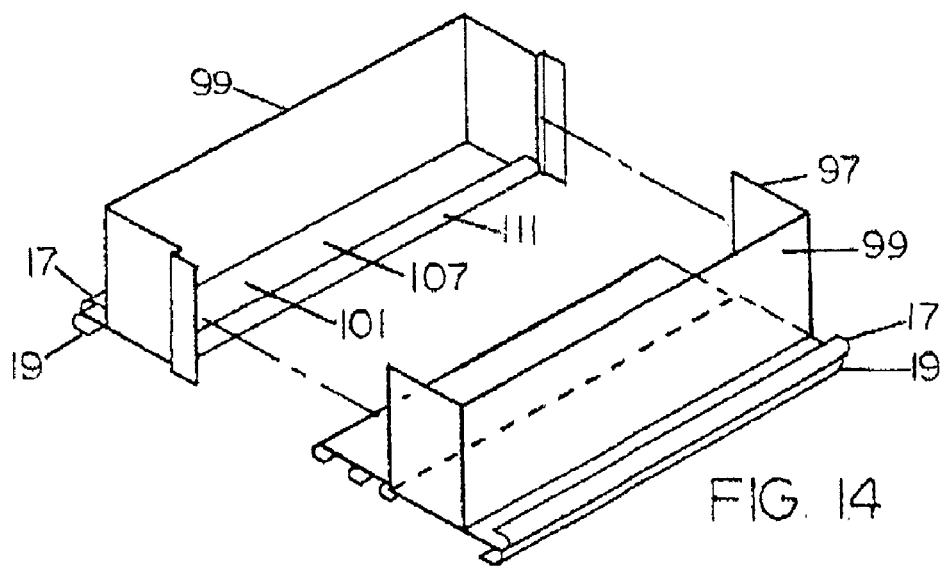
FIG. 14 is a pictorial view of an expandable box for use as an adjustable folder in the storage box.
Figure 15:
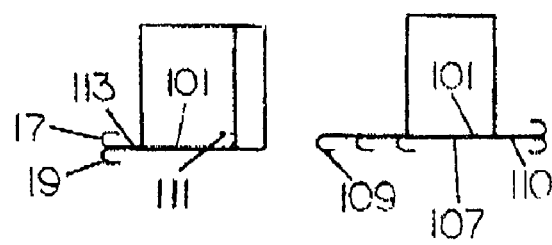
FIG. 15 is a cross sectional view of the base of the inner box shown in FIG. 14.

As shown in FIG. 14, an inner box 97, which is retractable, is provided. The inner box 97 serves to take up unused space for files and to hold miscellaneous items. The inner box 97 has two ends 91 and a base 101. The base 101 includes upper grooves 17 and lower grooves 19, but only at the two ends 99, so the inner box 97 can be used outside the storage box 11 and can be affixed to it and to other items having upper grooves 17 and lower grooves 19. The base 101 is formed in two sections 107, each section 107 being affixed to a different end 99. One base section 107 has a series of clips 109 affixed to the lower surface 110 of the base section 107. The other base section 107 has one clip 111 mounted on its upper surface 113. Each clip 109 on the lower surface 110 (FIG. 15) mates with the one clip 111 on the upper surface 113 and the size of the inner box 97 is determined by which clip 109 on the lower surface 110 is enaged by the one clip 111.

Figure 13:
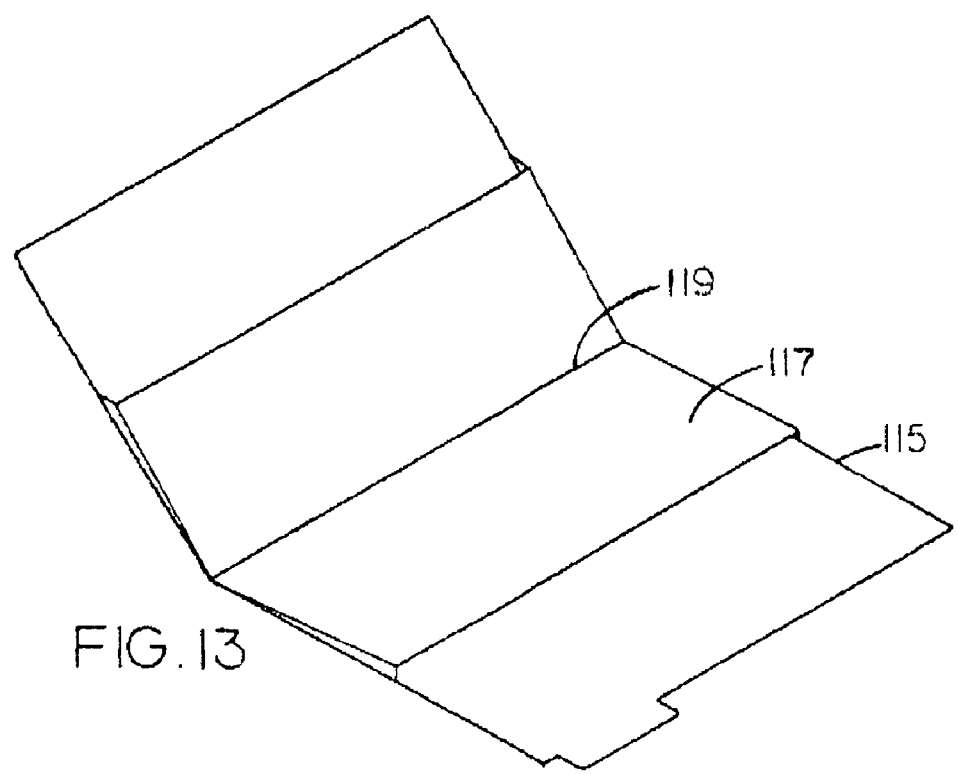
FIG. 13 is a pictorial view of a file folder with pockets on each side extending along the fold either inside or outside the folder.

In FIG. 13a file folder 115 is shown having pockets 117 which may be on either the interior or the exterior of the file folder 115 or on both the interior and the exterior of the file folder 115. Each pocket 117 is approximately half the size of the half of the file folder 115 on which it is located and each pocket 117 extends from the bend line 119 between the two halves of the file folder 115 with the opening into the pocket 117 being generally parallel to the bend line 119.

It is to be understood that the drawings and description matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

The invention claimed is:

1. A system for interlocking a plurality of items, such system comprising:
    a first item including a first planar base disposed beneath and supporting the first item, the first base having a plurality of edges, each edge having a first upper hook member defining a first upper groove and a first lower hook member defining a first lower groove, the first upper hook member being turned away from the edge and over the first base such that the first upper groove is disposed above the first base and opens in a direction facing away from the edge, and the first lower hook member being turned away from the edge and down under the first base such that the first lower groove is disposed beneath the first base and opens in a direction facing away from the edge; the first upper hook member and the first lower hook member each being U-shaped with the U being turned ninety degrees, parallel to the first base;
    a second item including a second planar base disposed beneath and supporting the second item, the second base having a plurality of edges, each edge having a second upper hook member defining a second upper groove and a second lower hook member defining a second lower groove, the second upper hook member being turned away from the edge and over the second base such that the second upper groove is disposed above the second base and opens in a direction facing away from the edge, and the second lower hook member being turned away from the edge and down under the second base such that the second lower groove is disposed beneath the second base and opens in a direction facing away from the edge; the second upper hook member and the second lower hook member each being U-shaped with the U being turned ninety degrees, parallel to the second base; and
    the second lower hook member being locked into the first upper groove, the second lower hook member and the first upper groove being sized to be forced into one another and to be held in place by the tightness of the fit while still being removable, wherein both the first base and the second base are rectangular and have four edges.

2. A system according to claim 1 wherein the first item is a label dispenser.

3. A system according to claim 1 wherein the first item is a label dispenser and the second item is a storage box.

4. A system for interlocking a plurality of items, such system comprising:
- a first item including a first planar base disposed beneath and supporting the first item, the first base having a plurality of edges, each edge having a first upper hook member defining a first upper groove and a first lower hook member defining a first lower groove, the first upper hook member being turned away from the edge and over the first base such that the first upper groove is disposed above the first base and opens in a direction facing away from the edge, and the first lower hook member being turned away from the edge and under the first base such that the first lower groove is disposed beneath the first base and opens in a direction facing away from the edge; the first upper hook member and the first lower hook member each being U-shaped with the U being turned ninety degrees, parallel to the first base;
- a second item including a second planar base disposed beneath and supporting the second item, the second base having a plurality of edges, each edge having a second upper hook member defining a second upper groove and a second lower hook member defining a second lower groove, the second upper hook member being turned away from the edge and over the second base such that the second upper groove is disposed above the second base and opens in a direction facing away from the edge, and the second lower hook member being turned away from the edge and under the second base such that the second lower groove is disposed beneath the second base and opens in a direction facing away from the edge; the second upper hook member and the second lower hook member each being U-shaped with the U being turned ninety degrees, parallel to the second base;
- a third item including a third planar base disposed beneath and supporting the third item, the third base having a plurality of edges, each edge having a third upper hook member defining a third upper groove and a third lower hook member defining a third lower groove, the third upper hook member being turned away from the edge and over the third base such that the third upper groove is disposed above the third base and opens in a direction facing away from the edge, and the third lower hook member being turned away from the edge and down under the third base such that the third lower groove is disposed beneath the third base and opens in a direction facing away from the edge; the third upper hook member and the third lower hook member each being U-shaped with the U being turned ninety degrees, parallel to the third base; and
- a first upper hook member being locked into a third lower groove and a second lower hook member being locked into a third upper groove, the second lower hook member and the third upper groove and the first upper hook member and the third lower groove being sized to be forced into one another and to be held in place by the tightness of the fit while still being removable, both the first base and the second base being rectangular and having four edges.

5. A system according to claim 4 wherein the first item is a label dispenser.